Aug. 30, 1927.
R. H. CROSBY
1,640,600
GAUGE TRAP
Filed June 20, 1924
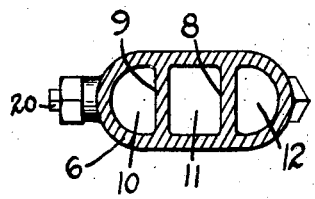
FIG. 3
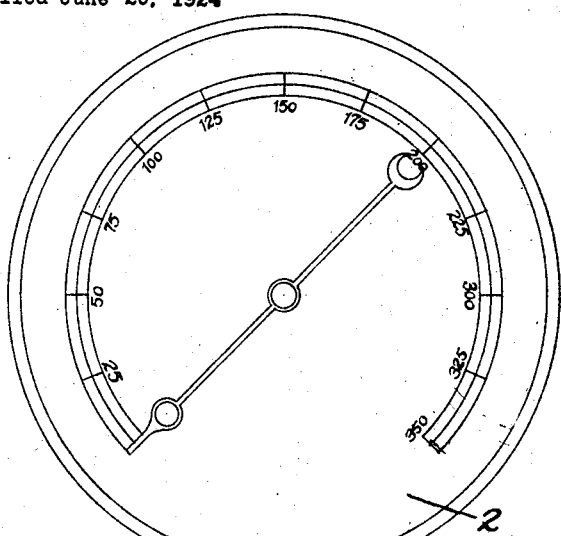
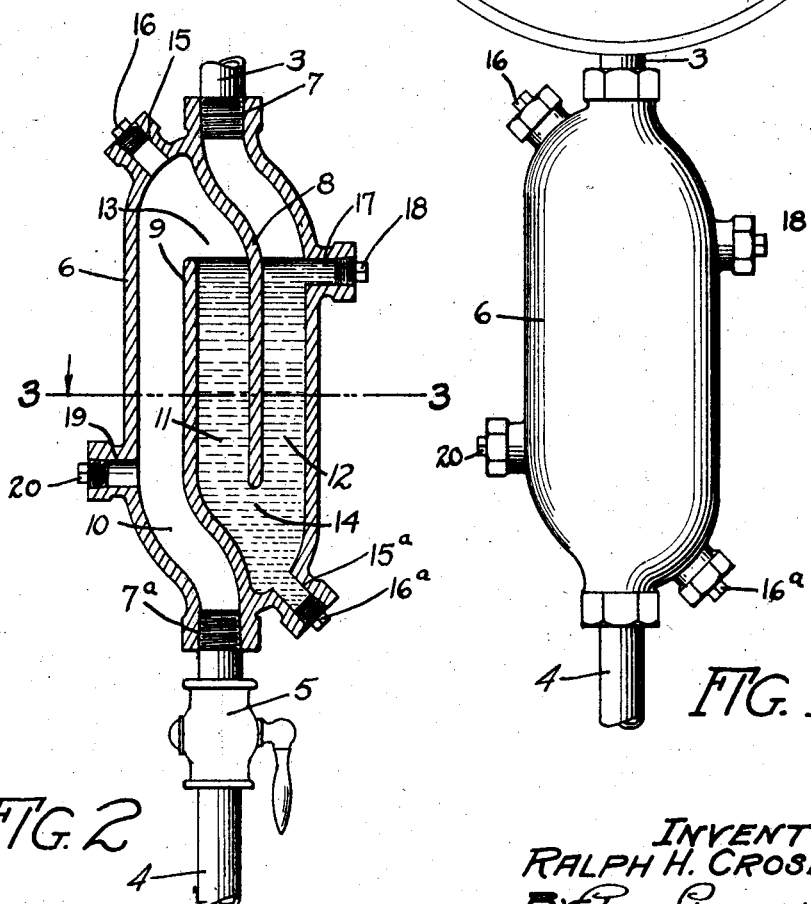
FIG. 2
FIG. 1
INVENTOR
RALPH H. CROSBY
BY
ATTORNEYS Patented Aug. 30, 1927.

1,640,600

UNITED STATES PATENT OFFICE.

RALPH H. CROSBY, OF MINNEAPOLIS, MINNESOTA, ASSIGNOR TO AMERICAN PLUMBING & HEATING COMPANY, OF MINNEAPOLIS, MINNESOTA, A CORPORATION OF MINNESOTA.

GAUGE TRAP.

Application filed June 20, 1924. Serial No. 721,268.

The object of my invention is to provide a trap or attachment for a gauge generally of the steam pressure type though the device may be used with other forms of liquid pressure gauges.

The object of the invention is to provide a trap that is reversible; that is either end may be connected to the gauge and still the trap be operative. There will be no danger therefore that an inexperienced or ignorant person will connect up the device in an improper manner.

A further object is to provide a trap having connections which adapt it for use either in a vertical or angular position, as desired.

Other objects of the invention will appear from the following detailed description.

The invention consists generally in various constructions and combinations all as hereinafter described and particularly pointed out in the claims.

In the accompanying drawings forming part of this specification,

Figure 1 is a front view of a gauge showing my improved trap connected therewith;

Figure 2 is a longitudinal sectional view through the trap;

Figure 3 is a horizontal sectional view on the line 3—3 of Figure 2.

In the drawing, 2 represents a gauge, generally speaking for steam pressure having the usual pipe connection 3. 4 is a pipe leading to a source of fluid pressure such as a steam boiler. A cut-off valve 5 is mounted in this pipe by means of which passage therethrough may be effectually closed whenever desired. 6 is a casing having threaded openings 7 and 7ª adapted to receive respectively the pipe sections 3 and 4. This casing is preferably flattened in form and is provided in its interior with longitudinally arranged walls 8 and 9 dividing the interior of the casing into passages 10, 11 and 12. The walls 8 and 9 terminate short of the adjacent end wall of the casing forming communicating openings 13 and 14 between the passages 10 and 11, and 11 and 12. A filling opening 15 having a plug 16 is provided in the end wall of the casing and a corresponding opening 15ª having a plug 16ª, is provided in the opposite end of the casing, one or the other of these openings being used for filling the trap with water or other suitable liquid depending upon which end of the trap is uppermost. One opening in either case will be at the bottom of the trap and may be utilized as a clean-out therefor; the clean-out in one position of the casing and trap becoming a filling opening therefor when the trap is inverted. An opening 17 having a plug 18 allows for the application of a test gauge to the trap when it is desired to test the accuracy of the gauge 2. The casing is also provided with an opening 19 and a plug 20 to which the boiler connection may be made should it be desired to use the device in an angular instead of a vertical position. It will make no difference with this form of trap which end is uppermost. The connections will be the same in both instances and the liquid seal will be formed in the trap in the same manner regardless of whether the casing is arranged as shown in Figure 2 or inverted with respect to that position. It will be understood if the casing shown in Figure 2 is inverted the opening 19 will then become the point of attachment for the test gauge while the opening 17 will be adapted for connection to the boiler when the trap is used in an angular position.

The trap may of course be made in various sizes, and in different ways the details of construction may be modified and still be within the scope of my invention.

I claim as my invention:

1. A gauge trap comprising a casing having similar attaching means at either end whereby either end may be attached to the same connection, overlapping walls dividing the interior of said casing into communicating upwardly and downwardly extending passages, thus forming reverse traps, said casing having a test gauge opening in communication with said passage on a level with the upper edge of a wall whereby when said trap is used as a gauge trap, an additional test gauge may be attached to the trap.

2. A gauge trap comprising a casing having similar attaching means at either end whereby either end may be attached to the same connection, overlapping walls dividing the interior of said casing into communicating upwardly and downwardly extending passages, thus forming reverse traps, said casing having a test gauge opening in communication with said passage on a level with the upper edge of a wall whereby when said trap is used as a gauge trap, an additional test gauge may be attached to the trap, and a clean-out opening at the base of each of said reverse traps.

3. A gauge trap comprising a casing having similar means for connection at each end with a gauge, said trap having overlapping walls dividing it into two reverse traps, whereby the trap may be reversed in ordinary use, said casing having clean-out openings at the base of each reverse trap, said casing also having openings on its side, the reverse traps being so arranged that the device may be attached to a gauge through either side opening and one of the reverse traps will function as a trap when a gauge is attached to a side opening.

4. A gauge trap comprising a casing with openings at either end and a side, interior overlapping walls in the gauge extending from side to side of the casing and forming a tortuous passage through the casing, the tortuous passage being so shaped that a trap will be formed in the casing when either end or the side opening is uppermost.

5. A gauge trap comprising a casing having overlapping walls thereon extending from the opposite ends cooperating to form a tortuous passage through said casing, the outer wall of said casing being tapped for pipe engaging connections, the passages formed by said walls being adapted to contain a liquid seal with either end of said casing uppermost, the overlapping walls in the casing being in planes one above the other when the casing is turned horizontally whereby the trap may be used in a horizontal position as well as a vertical position.

In witness whereof, I have hereunto set my hand this 17th day of June 1924.

RALPH H. CROSBY.